United States Patent [19]

Howell

[11] 4,433,326

[45] Feb. 21, 1984

[54] POWER LINE COMMUNICATION SYSTEM USING THE NEUTRAL AND GROUND CONDUCTORS OF A RESIDENTIAL BRANCH CIRCUIT

[75] Inventor: Edward K. Howell, Simsbury, Conn.

[73] Assignee: General Electric Company, New York, N.Y.

[21] Appl. No.: 231,631

[22] Filed: Feb. 4, 1981

[51] Int. Cl.³ .......................................... H04M 11/04
[52] U.S. Cl. .......................... 340/310 A; 340/310 R; 340/310 CP; 361/332
[58] Field of Search ........ 340/310 A, 310 R, 310 CP, 340/538; 361/332–334, 48, 113; 179/27 H, 2 R, 2.51, 82

[56] References Cited

U.S. PATENT DOCUMENTS

| | | | |
|---|---|---|---|
| 2,023,857 | 12/1935 | Satterlee et al. | 340/310 R |
| 3,287,722 | 11/1966 | Craig | 340/310 A |
| 3,702,460 | 11/1972 | Blose | 340/310 A |
| 3,810,096 | 5/1974 | Kabat et al. | 340/310 CP |
| 3,911,415 | 10/1975 | Whyte | 340/310 A |
| 4,075,675 | 2/1978 | Burkett et al. | 340/310 R |

*Primary Examiner*—Donnie L. Crosland
*Attorney, Agent, or Firm*—Richard A. Menelly; Walter C. Bernkopf; Fred Jacob

[57] ABSTRACT

At a point on a residential branch circuit downstream from the service entry load center where the termination of the neutral conductor thereof is solidly clamped to ground and the ground conductor is terminated in electrical connection in common with the neutral conductor termination, a transformer is linked with one of the neutral and ground conductors. Downstream from the transformer, a capacitive coupler is connected across the branch circuit neutral and ground conductors. A transmitter of high frequency voltage signals is connected with either the transformer or capacitive coupler and a signal receiver is connected with the other thereof, such as to establish a communications lin between the transmitter and receiver using the branch circuit neutral and ground conductors.

13 Claims, 4 Drawing Figures

POWER LINE COMMUNICATION SYSTEM USING THE NEUTRAL AND GROUND CONDUCTORS OF A RESIDENTIAL BRANCH CIRCUIT

BACKGROUND OF THE INVENTION

The present invention relates to power line communication (PLC) systems and particularly to a PLC system for communicating over existing residential wiring.

Numerous attempts to communicate over electrical power distribution conductors have been made in the past. The most successful of these have been those communication systems utilizing conductors of power distribution networks which can be readily tailored to accommodate successful communication, such as electric railway and primary power distribution networks. However, attempts to communicate over the power lines within a building have not generally been successful. The most significant problem encountered is noise. Since prior art approaches to communicating over residential branch circuits have traditionally utilized the line and neutral conductors as the communication links, noise generated by connected loads poses a significant obstacle to successful communication. The most common source of noise in residential power circuits are current switching devices which can be either of the mechanical or solid-state variety. Typically such noise is basically of a transient nature, but may be generated repetitively, as in the case of series motors and lamp dimmers. Noise can appear as voltages between line and neutral conductors, as well as currents flowing therethrough. Voltage magnitudes are typically in the range of 100 to 300 volts with frequency components ranging from 60 Hertz to hundreds of megaHertz. The internal reactance of the utilities' distribution transformer feeding the residential power circuits results in a transient disturbance of the line voltage with each switch opening and closing having frequency components within a typical PLC signal frequency band. In the case of a solid-state lamp dimmer, this disturbance may exceed 100 volts on each half-cycle of the 60 Hertz voltage wave. The large amplitude, fast rise-time (relative to PLC signal frequency), and repetitive nature of lamp dimmer noise are particularly troublesome to successful communication.

Furthermore, mechanical switches, such as timers, thermostats and motor brushes, transiently become spark-gap relaxation oscillators typically producing 300 volt disturbances at repetition rates within the PLC signal band and having frequency components extending to several hundred megaHertz. Such noise may be isolated bursts lasting a few milliseconds to repetitive trains, as in the case of series motors. The large amplitudes and wide range of frequencies of these noise disturbances pose a real challenge to receiver design.

Compounding the noise problem, PLC signal strength can vary widely throughout the building, especially between the two legs of the 120/240 volt electrical service, and is heavily dependent on the loads connected into the branch circuits. In general, inductive loads such as motors present a relatively high impedance to PLC signals. Resistive loads may vary widely from, for example, 144 ohms for a 100 Watt incandescent lamp to 12 ohms for a 1200 Watt toaster. The presence of a significant shunt capacitance in residential loads has not been prevalent in the past but is likely to increase. A load having a 0.1 microfarad capacitor imposes a 10 ohm shunt to PLC signals at a frequency of 160 kHz.

Increasing the transmitter's signal power to improve signal to noise ratio and provide successful signal reception throughout a building exacerbates the problem of PLC signals escaping the building via the line and neutral cables of the service entry drop. When these PLC signals reach the distribution transformer, they are blocked by the high internal transformer impedance. However, they can readily propagate along commonly connected service drops into other buildings fed thereby. It will be appreciated that what is signal to one PLC system is noise to all other PLC systems and the worst form of noise at that. Thus, PLC signals escaping one PLC system via a service drop and entering another PLC system via a commonly connected service drop poses especially serious noise problems for the latter system. Of course, signal traps may be utilized in the service entry drops to block such signal escape; however, to be effective, such traps are necessarily large and expensive.

Another problem in using the branch circuit line and neutral conductors to signal over is the necessity for some form of coupling impedance to enable communication between the two legs of the 120/240 volt electrical service installed in most buildings. Such coupling impedance is primarily provided by wiring capacitances and any 240 volt loads, such as ranges, water heaters, clothes dryers, etc. The internal impedance of the distribution transformer can rarely provide the requisite signal coupling impedance between the service legs. However, if a PLC system avails itself of this distribution transformer coupling impedance, its signals are available to invade other buildings as noise to any PLC system installed therein.

In the context of PLC systems for communicating between an electrical utility and its power-consuming customers for such purposes as remote meter reading, it has been proposed to utilize the distribution network neutral conductor and ground return as the communication link. This approach, exemplified in U.S. Pat. Nos. 3,702,460 and 4,016,429, is seen to avoid the impedance matching and signal attenuating problems posed by the continuously varying network loads connected between the phase or line conductors and neutral. Since a communication link utilizing the neutral conductor of a utilities' distribution network involves a multiplicity grounds, the neutral conductor being connected to ground at the service entry load center of each customer, the PLC systems described in these patents cannot be adapted to accommodate communication over branch circuits within a building inasmuch as the system neutral is necessarily grounded at only one point.

PLC systems have also been proposed for communicating over the branch circuits within a large building, such as a hotel, wherein PLC signals are coupled onto the neutral conductors and with respect to ground, as evidenced by U.S. Pat. Nos. 2,743,434 and 3,810,096. The systems disclosed therein rely on the imposition of an inductive reactance of negligible impedance at the 60 Hertz power between neutral and ground so as to provide, at the elevated PLC signal frequency, sufficient impedance separating the branch circuit neutral conductor terminations at the service entrance from ground potential to support an adequate signal voltage on the branch circuit neutral conductors with respect to ground. However, when this is done, the PLC signals can readily propagate out onto the neutral cable of the service drop and thence to the distribution transformer where they are coupled as noise onto other commonly connected service drop neutral cables. Since the PLC systems of these patents contemplate large buildings, this is probably not a problem as, in all likelihood, there are no other service drops commonly connected at the distribution transformer.

It is accordingly an object of the present invention to provide an improved power line communication system for signalling over residential branch circuits.

An additional object is to provide a power line communication system of the above character wherein signal integrity is relatively unaffected by branch circuit loads and any noise generated thereby.

A further object is to provide a power line communication system of the above character wherein signal strength can be made essentially uniform throughout the system of branch residential circuits.

Yet another object is to provide a power line communication system wherein the escape of signals out onto the service entry drop is effectively avoided.

Another object is to provide a power line communication system of the above character which is economically and conveniently adaptable to existing residential power circuits.

Other objects of the invention will in part be obvious and in part appear hereinafter.

SUMMARY OF THE INVENTION

In accordance with the present invention, there is provided a power line communication (PLC) system for signalling over the branch circuits of an AC power distribution system within a building, such as a residential dwelling. The communication links utilized are those branch circuits equipped with a separate ground conductor, in addition to line and neutral conductors. Since, in accordance with the present invention, only the branch circuit neutral and ground conductors are utilized for communication, the obstacles to successful communication posed by loads connected across the branch line and neutral conductors are largely avoided. Virtually the only noise seen by the subject PLC system is the voltage drop along the neutral conductor created by the flow therethrough of load and noise currents, which drop is obviously quite small and can be ignored or readily compensated for.

Since code requirements call for the termination of the neutral cable in the service feed or drop to be solidly connected to a single grounding point, i.e., clamped to ground potential, at the service entry equipment or load center, with all of the branch circuit neutral and ground conductors terminated at the load center in common electrical connection with the grounded neutral cable, the present invention utilizes inductive means to develop, at the selected elevated PLC signal frequency, an impedance effectively separating from each other the neutral and ground conductor runs downstream therefrom. This largely inductive impedance accommodates the development of a satisfactory PLC signal voltage between the neutral and ground conductors for communicating over the branch circuit thereof. Depending on where this inductance is imposed, which incidentally exhibits negligible impedance at the considerably lower power frequency, the signal voltage developed thereacross may appear on the downstream portion of the branch circuit neutral conductor with respect to the ground potential of the branch circuit ground conductor or on the ground conductor with respect to the ground potential on the neutral conductor.

More specifically, the inductive means is in the form of a signal coupling transformer having a core embracing either a branch circuit neutral conductor downstream from its grounded termination with the service entry neutral cable or a branch circuit ground conductor downstream from its termination commonly grounded with the neutral conductor and service entry neutral cable to accommodate communication exclusively over the downstream portion of that particular branch circuit.

Wound on the signal coupling transformer core is a second winding for electrical connection with either a signal transmitter or a signal receiver. At any desired downstream location on the branch circuit communication link, a capacitive signal coupling, exhibiting a high impedance at the power frequency and a relatively lower impedance at the PLC power frequency, connects either a signal receiver or a signal transmitter across the neutral and ground conductors thereof. This capacitive coupling serves to maintain the neutral and ground conductors downstream from the load center effectively electrically isolated from each other at the power frequency, thus precluding the flow of any load current through the ground conductor.

As an important feature of the present invention, regardless of where the signal coupling transformer is linked into the residential power circuit, the neutral conductor of each branch circuit communication link is firmly clamped to ground potential at all frequencies, including the PLC signal frequency, at the service entry load center. Consequently, unlike the situation in the above-noted U.S. Pat. No. 2,743,434, signal voltages appearing across the neutral and ground conductors of the branch circuit communication link are shorted out at the load center and thus do not propagate out of the building onto the service entry neutral cable.

The invention accordingly comprises the features of construction, combinations of elements and arrangements of parts which will be exemplified in the constructions hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several figures of the drawings.

DETAILED DESCRIPTION

Figure 1:
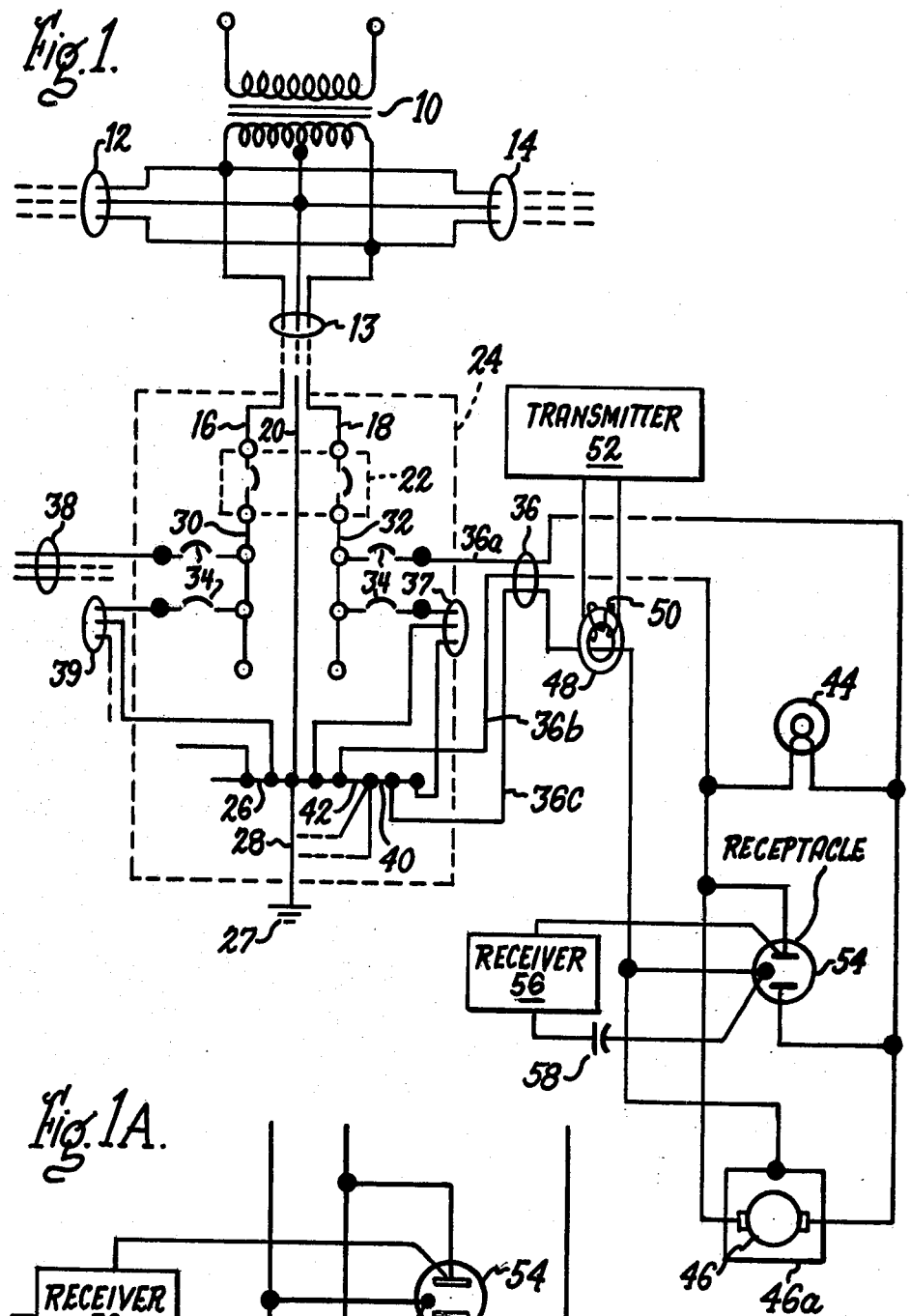
FIG. 1 is a circuit schematic diagram, partially in block diagram form, of a residential power line communication system constructed in accordance with one embodiment of my invention.

Referring to FIG. 1, a distribution transformer 10 is illustrated with its secondary center tapped to provide conventional 120/240 volt residential electrical service. Commonly connected with this transformer secondary are a plurality of service entry feeds or service drops running to the various buildings being served. Three such service drops are depicted at 12, 13 and 14. Each drop is a three-wire, single phase service consisting of a pair of mains plus a neutral cable. As seen in the case of service drop 13, mains 16 and 18 are separately electrically terminated at main circuit protective devices, such as the line terminals of a two-pole main circuit breaker 22 included in the customer's service entrance equipment, such as a load center 24. Neutral cable 20 of this service drop is electrically terminated in the load center at a neutral bus 26 which, in turn, is solidly connected to a convenient external grounding point 27, such as a water pipe, by a grounding wire 28. The load terminals of main circuit breaker are connected to a pair of main busbars 30 and 32 insulatively mounted within the load center enclosure. The various 120 volt branch circuits served by the load center have their line conductors separately connected via individual branch circuit protective devices, such as branch circuit breakers 34 to one or the other of the main busbars and their neutral conductors commonly connected to neutral bus 26. Those branch circuits fed from main busbar 32, such as those indicated at 36 and 37, can be considered as constituting one leg of the single phase, three wire service, and those branch circuits, such as 38 and 39, fed from main busbar 30 constituting the other leg thereof. While not illustrated, it will be appreciated that a 240 volt branch circuit is fed from both main busbars via a two-pole circuit breaker.

For many years now residential branch circuit wiring has included a ground conductor in addition to load current carrying line and neutral conductors. These branch circuit ground conductors have been commonly terminated at neutral bus 26 within the load center, however modern wiring practice calls for these ground conductors to be terminated at one or more separate, ground buses provided in the load center, one being indicated at 40. This ground bus is then electrically connected in common with the grounded neutral bus 26, either via the metallic load center enclosure or by a discrete tie conductor, such as illustrated at 42.

Still referring to FIG. 1 the PLC system embodiment of my invention illustrated therein is seen to utilize branch circuit 36 as its communication link. The line conductor 36a and neutral conductor 36b thereof serve to deliver load current to power various loads connected in parallel thereacross, such as incandescent lights 44 and an appliance motor 46. Ground conductor 36c runs co-extensively with its branch circuit line and neutral conductors and is shown connected to ground the appliance housing 46a. To couple signals onto this communication link, there is provided a signal coupling transformer including a small core 48 disposed in embracing relation with ground conductor 36c at a location on branch circuit 36 adjacent to or even within load center 24. Wound on this core is a multi-turn primary winding 50 which is connected to a transmitter 52 of PLC signals having a frequency of, for example, 160 kHz. The portion of ground conductor 36c linked by the core constitutes a single-turn secondary winding in which is imposed an inductive impedance effectively separating, at the PLC signal frequency, the downstream run of the ground conductor from ground potential to which its termination at ground bus 40 is effectively clamped. Transmitter 52, in driving primary winding 50, develops a signal voltage across this secondary winding impedance, which signal voltage appears on the ground conductor downstream therefrom and is with respect to the ground potential on neutral conductor 36b.

Reference numeral 54 indicates a conventional wall receptacle located in branch circuit 36 downstream from the signal transformer. Its line and neutral stabs are respectively connected to the line and neutral conductors, while its ground stab is connected to the ground conductor. To receive the voltage signals appearing on the ground conductor, a receiver 56 can be simply plugged into this receptacle such as to be connected across the neutral and ground conductors via capacitive coupling means represented by a capacitor 58. The value of this capacitor is selected to provide a low impedance at the signal frequency, for example 10 ohms, and a high impedance of many thousands of ohms at the power frequency. Preferably the receiver has a high internal impedance so as to maintain adequate signal voltage for other receivers that may be capacitively signal coupled onto branch circuit 36.

Figure 1A:
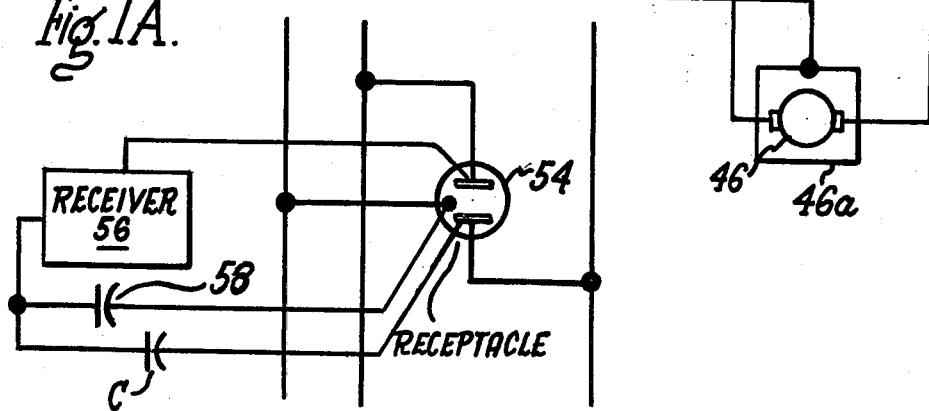
FIG. 1A is a circuit schematic diagram of an alternate means of connection between the receiver and receptacle shown in FIG. 1.

It will be observed that the terminations of the neutral and ground conductors in the load center upstream from the signal coupling transformer are effectively shorted together and clamped to ground potential at the signal frequency, and therefore no signal voltage can appear on neutral bus 26 for propagation out onto neutral cable 20 of the service drop 13. Moreover, due to the absence of any effective signal coupling impedance between ground conductor 36c and line conductor 36a downstream from the signal coupling transformer, except for stray wire capacitance, PLC voltage signals of significant magnitudes cannot be coupled onto the line conductor and thence propagate out onto service drop main 18. Thus the present invention inherently traps the PLC voltage signals within the particular residential power distribution system in which the PLC system is installed, thereby eliminating the need for separate, relatively expensive signal traps. In fact, in the embodiment of FIG. 1, it is seen that the PLC voltage signals are confined exclusively to branch circuit 36 due to the absence of signal on neutral bus 26 and on line conductor 36a. It will be further appreciated that the positions of the transmitter and receiver shown in FIG. 1 may be reversed, such that the transmitter is capacitively coupled across the neutral and ground conductors at a downstream location on branch circuit 36 for communication with a receiver transformer coupled with the ground conductor at an upstream location. Moreover, it will readily occur to those skilled in the art that the transmitter and receiver of FIG. 1 may each be transceivers for two-way communication over the communication link provided by branch circuit 36. It is further envisioned that receiver 56 of FIG. 1 may also be connected to line conductor 36a via a coupling capacitor indicated in FIG. 1A at C, in order to provide the capability of cancelling noise voltages seen by the receiver resulting from noise current flowing through the wire impedance of the neutral conductor. Such noise voltages would also appear on the line conductor in equal magnitudes but of opposite polarity.

Figure 2:
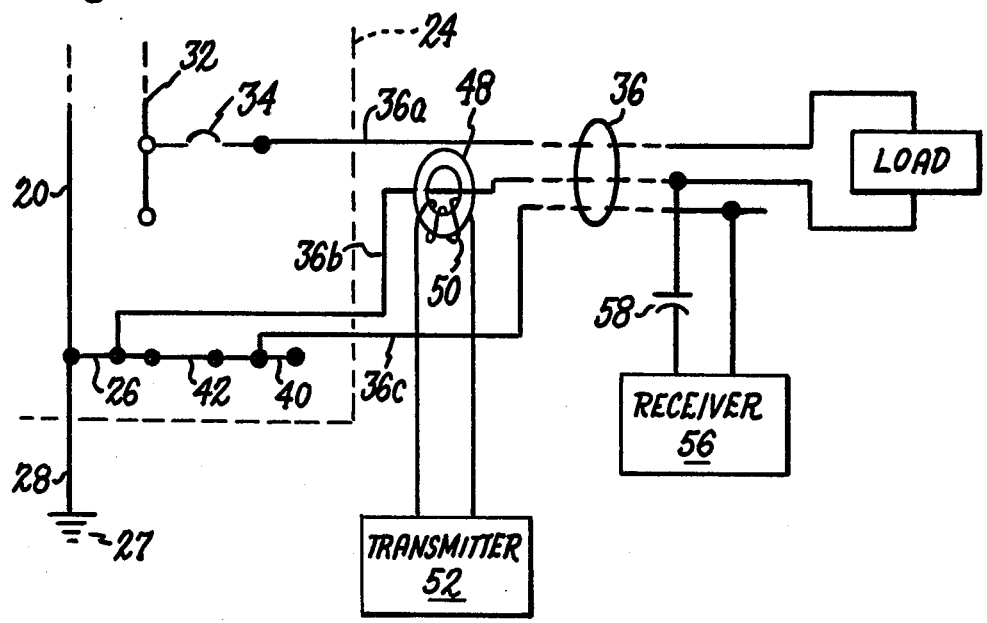
FIG. 2 is an abbreviated circuit schematic diagram, partially in block diagram form, of a residential PLC system constructed in accordance with an alternative embodiment of my invention.

The embodiment of the invention seen in FIG. 2 shows that the signal coupling transformer core 48 may embrace neutral conductor 36b such as to induce PLC voltage signals thereon with respect to the ground conductor. These signals are detected by receiver 56 capacitively coupled between the ground and neutral conductors at a downstream location on branch circuit 36. As in the embodiment of FIG. 1, the voltage signals cannot appear on neutral bus 26 since it is clamped to ground potential. The drawback to this embodiment of FIG. 2 is that signals can be coupled onto line conductor 36a via the impedances of loads connected between the line and neutral conductors. These signals can then invade other branch circuits and escape out onto the service drop main 18, unlike the situation in the embodiment of FIG. 1.

Figure 3:
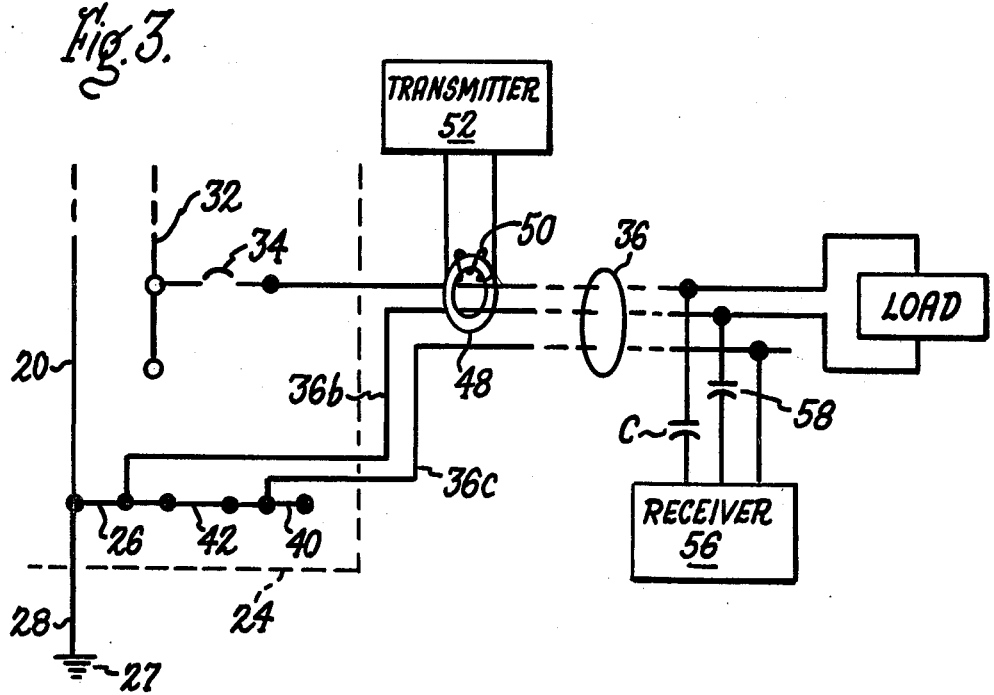
FIG. 3 is an abbreviated circuit schematic diagram, partially in block diagram form, of yet another residential PLC system embodiment of my invention.

In the embodiment of my invention seen in FIG. 3, signal coupling transformer core 48 is shown embracing line conductor 36a as well as neutral conductor 36b of branch circuit 36. Thus, voltage signals are coupled onto both the line and neutral conductors with respect to ground conductor 36c. In this case, noise cancelling capacitor C may be used to capacitively couple receiver 56 to both the line and neutral conductors, as shown, such as to detect the common mode voltage signals appearing on both conductors with respect to ground conductor 36c. Since most noise on the line and neutral conductors are of the opposite phases, superior noise rejection within the receiver can be readily implemented. Another advantage over the embodiment of FIG. 2 lies in the fact that the fluxes developed in core 48 by the currents flowing in opposite directions through the line and neutral conductors cancel. Consequently, the PLC voltage signals induced on the line and neutral conductors are of a cleaner, purer character. Also, coupling equal signal voltages on the line and neutral conductors eliminates signal current from the upstream portion of the line conductor, as well as main busbar 32 and service entry main 18 as can occur in the embodiment of FIG. 2 wherein the signal voltage coupled solely onto the neutral conductor by the coupling transformer can be coupled onto the line conductor via loads connected therebetween. That this is precluded in the embodiment of FIG. 3 is seen from the fact that since the signal voltages on the line and neutral conductors are equal both upstream and downstream of the coupling transformer and the signal voltage on the upstream portion of the neutral must be zero (since it is clamped to ground potential), then the signal voltage on the line conductor upstream of the coupling transformer must also be zero.

As mentioned in connection with the embodiment of FIG. 1, the positions of the transmitter and receiver in the embodiments of FIGS. 2 and 3 may be reversed or may each be transceivers for two-way communication over branch circuit 36. Also, noise cancelling capacitor C may be utilized in the embodiment of FIG. 2. Particularly in the case of the embodiments of FIGS. 1 and 3, the conductors appear to the signal coupling transformer as an open line, assuming a relatively high receiver input impedance. Signal current is therefore low and there is very little signal voltage attenuation throughout the branch circuit communication link. It will be appreciated that core 60 may be utilized simply to introduce an inductive impedance in one of the branch circuit neutral and ground conductors linked therewith such as to separate the downstream portion of the linked conductor from the other of the neutral and ground conductors for the propagation of voltage signals thereover. A transmitter and receiver or a pair of transceivers are then capacitively coupled across the neutral and ground conductors at branch circuit locations downstream from the core.

It will be readily appreciated by those skilled in the art that utilizing the branch circuit ground and neutral conductors of communication in accordance with the present invention accommodates reductions in the size and cost of the transmitters and receivers since they need not be subjected to the continuous stress of line voltage and high transient voltages appearing between line and neutral. The same is true of the coupling capacitors which may have lower voltage ratings and enjoy greater life expectancy and reliability. Since the problems of noise are greatly mitigated, PLC signal magnitude can be reduced and still provide successful communication, thus further insuring against the escape of appreciable signal from the communication link. The inherent signal voltage uniformity throughout the communication link reduces receiver costs since the dynamic operating range is reduced.

While the disclosed embodiments of the invention contemplate communicating exclusively over a single residential branch circuit, it will occur to those skilled in the art that inter-branch circuit communication could be provided by paralleling windings 50 of separate signal coupling transformers respectively linked with several branch circuits. Alternatively, signals received over one branch circuit could be retransmitted over a desired other branch circuit via appropriate signal coupling means as disclosed herein. However, for a more practical and thus preferred approach to inter-branch circuit communication, reference should be made to my commonly assigned co-pending application entitled "Power Line Communication Over Ground and Neutral Conductors of Plural Residential Branch Circuits", filed concurrently herewith. It will be appreciated that signals received over the residential branch circuit communication link may be put to a myriad of purposes such as remote switching in and out or otherwise controlling branch circuit loads, fire and intrusion alarming, voice communication, and so on.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A power line communication system for signalling over a low voltage AC power distribution system for distributing electrical power at an AC power frequency throughout a building, wherein the power distribution system includes a load center and a plurality of branch circuits, the load center having at least one main busbar to which a main of a service entry feed is connected and a neutral bus to which a neutral cable of the service entry feed is connected, the neutral bus being solidly clamped to ground potential, each branch circuit having a line conductor electrically connected with the main busbar and a neutral conductor terminated in electrical connection with the neutral bus, said communication system comprising, in combination:

A. a signal communication link consisting of at least one of the branch circuits, said one branch circuit including, in addition to a line conductor and a neutral conductor, a ground conductor terminated within the load center in common electrical connection with the neutral bus and neutral conductor and otherwise electrically isolated from the neutral conductor downstream from the load center;

B. a transmitter for transmitting voltage signals of a frequency greater than the power frequency;

C. a receiver tuned to receive said voltage signals;

D. a signal coupling transformer having a core magnetically linked with a segment of one of the neutral and ground conductors of said one branch circuit to provide one winding thereof and a second winding wound on said core connected with one of said transmitter or said receiver, whereby an impedance is created in said segment across which said voltage signals are developed; and E. capacitive coupling means connecting the other of said transmitter or said receiver across the neutral and ground conductors of said one branch circuit at a location downstream from said transformer, said coupling means exhibiting a high impedance at the power frequency, whereby voltage signals appearing on one of the ground and neutral conductors with respect to the other propagate along said one branch circuit between said transmitter and receiver, said voltage signals being precluded from propagating onto the neutral cable of the service entry feed by virtue of the neutral bus being clamped to ground potential at the voltage signal frequency.

2. The power line communication system defined in claim 1, wherein said transformer core embraces one of said one branch circuit neutral and ground conductors to constitute a one-turn transformer winding.

3. The power line communication system defined in claims 1 or 2, wherein said transformer core is linked with the ground conductor of said one branch circuit.

4. The power line communication system defined in claims 1 or 2, wherein said transformer core is linked with said neutral conductor of said one branch circuit.

5. The power line communication system defined in claims 1 or 2, wherein said transformer core is linked with both the line and neutral conductors of said one branch circuit.

6. The power line communication system defined in claim 1, wherein said transmitter is connected to drive said second transformer winding and said capacitive coupling means connects said receiver across the neutral and ground conductors of said one branch circuit, said receiver having a relatively high input impedance and said capacitive coupling means having a relatively low impedance at the signal frequency.

7. The power line communication system defined in claim 6, wherein said transformer core embraces one of said one branch circuit neutral and ground conductors to constitute a one-turn transformer winding.

8. The power line communication system defined in claims 6 or 7, wherein said transformer core is linked with the ground conductor of said one branch circuit.

9. The power line communication system defined in claims 6 or 7, wherein said transformer core is linked with said neutral conductor of said one branch circuit.

10. The power line communication system defined in claims 6 or 7, wherein said transformer core is linked with both the line and neutral conductors of said one branch circuit.

11. A power line communication system for signalling over a low voltage AC power distribution system for distributing electrical power at an AC power frequency throughout a building, wherein the power distribution system includes a load center and a plurality of branch circuits, the load center having at least one main busbar to which a main of a service entry feed is connected and a neutral bus to which a neutral cable of the service entry feed is connected, the neutral bus being solidly clamped to ground potential, each branch circuit having a line conductor electrically connected with the main busbar and a neutral conductor terminated in electrical connection with the neutral bus, said communication system comprising, in combination:

A. a signal communication link consisting of at least one of the branch circuits, said one branch circuit including, in addition to a line conductor and a neutral conductor, a ground conductor terminated within the load center in common electrical connection with the neutral bus and neutral conductor and otherwise electrically isolated at the AC power frequency from the neutral conductor downstream from the load center;

B. means for serially introducing an inductive impedance in one of said ground and neutral conductors of said one branch circuit at a location downstream from their common connection to ground within the load center, said inductive impedance having a negligible impedance at the power frequency and an appreciable impedance at an elevated signal frequency;

C. a transmitter coupled with said communication link for developing voltage signals at said signal frequency across said inductive impedance for propagation exclusively over the portion of said one of said ground and neutral conductors downstream from the location of said inductive impedance; and D. a receiver coupled with said communication link for detecting said voltage signals appearing on said downstream portion of said one of said ground and neutral conductors with respect to ground potential appearing on the other of said ground and neutral conductors of said one branch circuit; and E. at least one of said transmitter or said receiver being capacitively coupled across said ground and neutral conductors.

12. The power line communication system defined in claim 11, wherein said inductive impedance introducing means includes a magnetic core linked with said one of said ground and neutral conductors of said one branch circuit.

13. The power line communication system defined in claim 11, wherein said inductive impedance means comprises a signal coupling transformer having a magnetic core linked with said one of said ground and neutral conductors of said one branch circuit, and a winding wound on said core, one of said transmitter or said receiver being connected with said winding, the other of said transmitter or said receiver being capacitively coupled across said ground and neutral conductors of said one branch circuit at a site downstream from said core.

* * * * *